US 6,722,446 B1

(12) United States Patent
Johnson

(10) Patent No.: US 6,722,446 B1
(45) Date of Patent: Apr. 20, 2004

(54) APPARATUS FOR MECHANICALLY CONTROLLING AND ERADICATING CACTUS AND OTHER SUCCULENT PLANTS FROM FARM AND RANCH PASTURES AND OTHER LANDS

(76) Inventor: Gary W. Johnson, 5886 New Windsor Pkwy., McGregor, TX (US) 76657

( * ) Notice: Subject to any disclaimer, the term of this patent is extended or adjusted under 35 U.S.C. 154(b) by 0 days.

(21) Appl. No.: 10/105,663

(22) Filed: Mar. 25, 2002

(51) Int. Cl.[7] ............................................. A01B 15/00
(52) U.S. Cl. ..................... 172/684.5; 172/610; 172/611
(58) Field of Search ........................... 172/684.5, 611, 172/610, 387, 799.5; 37/219, 268

(56) References Cited

U.S. PATENT DOCUMENTS

| | | | | | |
|---|---|---|---|---|---|
| 1,184,622 | A | * | 5/1916 | Clarkson | 172/393 |
| 1,215,011 | A | * | 2/1917 | Findley | 172/387 |
| 1,219,375 | A | * | 3/1917 | Chaffin | 172/684.5 |
| 1,273,654 | A | * | 7/1918 | Osborne | 172/684.5 |
| 1,339,664 | A | * | 5/1920 | Nelson | 172/435 |
| 1,397,751 | A | * | 11/1921 | Allington | 172/26.5 |
| 1,412,193 | A | * | 4/1922 | Neudeck | 172/684.5 |
| 1,418,225 | A | * | 5/1922 | Banwart | 172/435 |
| 1,572,824 | A | * | 2/1926 | Tatge | 37/283 |
| 1,585,044 | A | * | 5/1926 | Patton | 172/136 |
| 1,641,580 | A | * | 9/1927 | Denison | 172/684.5 |
| 1,687,626 | A | * | 10/1928 | Mansker | 172/684.5 |
| 1,695,635 | A | * | 12/1928 | Duffield | 172/684.5 |
| 1,727,181 | A | * | 9/1929 | Skinner | 172/685 |
| 1,743,296 | A | * | 1/1930 | Weaver | 171/83 |
| 1,779,548 | A | * | 10/1930 | Lage | 172/618 |
| 2,370,901 | A | * | 3/1945 | Woodworth | 172/278 |
| 2,428,857 | A | * | 10/1947 | Smith | 172/445.1 |
| 2,761,226 | A | * | 9/1956 | Solem | 37/219 |
| 2,817,203 | A | * | 12/1957 | Sievers et al. | 172/684.5 |
| 2,843,032 | A | * | 7/1958 | Jones | 172/611 |
| 2,888,996 | A | * | 6/1959 | Ralston | 172/448 |
| 2,971,588 | A | * | 2/1961 | Schawb | 172/684.5 |
| 3,154,151 | A | * | 10/1964 | Zimmer et al. | 172/456 |
| 3,208,535 | A | * | 9/1965 | Fischer | 172/6 |
| 3,814,190 | A | * | 6/1974 | Wilson | 172/26.5 |
| 4,506,741 | A | * | 3/1985 | Hula, Jr. | 172/445.1 |
| 4,850,433 | A | * | 7/1989 | West | 172/32 |
| 5,191,943 | A | * | 3/1993 | Minor et al. | 172/393 |
| 5,659,984 | A | * | 8/1997 | Haug | 37/219 |
| 5,921,324 | A | * | 7/1999 | Anderson | 172/176 |
| 5,974,703 | A | * | 11/1999 | Cadarette | 37/269 |
| 6,085,848 | A | * | 7/2000 | Sanders | 172/684.5 |

* cited by examiner

Primary Examiner—Thomas B. Will
Assistant Examiner—Alexandra K. Pechhold

(57) ABSTRACT

A machine for controlling and eventually eradicating cactus and other succulent plants in farm and ranch pastures and other lands and land uses. This apparatus for mechanically controlling and eradicating cactus and other succulent plants uses a cutter deck on the machine to break off cactus pads near ground level. The tool uses a crushing rail to crush and mangle cactus pads and large portions of other succulents increasing the probability that the plant parts will not reroot. The machine in its preferred embodiment is towed by a tractor or other vehicle. A preferred embodiment includes a ballast rail to increase the weight of the tool and enhance the crushing action and a chain tow bridle to attach the tool to the towing vehicle. Another preferred embodiment includes a loop forming bolt to hold the bridle.

10 Claims, 4 Drawing Sheets

APPARATUS FOR MECHANICALLY CONTROLLING AND ERADICATING CACTUS AND OTHER SUCCULENT PLANTS FROM FARM AND RANCH PASTURES AND OTHER LANDS

BACKGROUND OF THE INVENTION

This invention relates generally to the field of agricultural, farm and ranch equipment, and more particularly to devices for mechanically controlling and eradicating cactus and other succulent plants from farm and ranch pastures and other lands.

Cactus infestations can create management problems in terms of competition for water and soil nutrients, animal movement, animal health problems, and fencing and corral maintenance. Many tools, herbicides and methods have been used to attempt eradication of these plants. There have been many types of drag tools for knocking down cactus. Prior methods and tools either did substantial damage to the land or did not adequately damage or destroy the unwanted plant material. The tool described here will attack most varieties of cactus and is especially effective on prickly-pear cactus. It does very little damage to wildflowers, and almost none to pasture grasses. There are many variations possible, with a preferred embodiment having a small leading edge gap, and a smooth heavy linear surface in ground contact, with a small trapped space in-between.

The leading edge gap breaks up the cactus plants into small chunks or individual pads. The trapped space forces this debris to get folded up. The smooth, heavy contact surface crushes and mangles the cactus as it goes underneath out the back.

Flowers and grass simply pass unscathed through the leading-edge gap. The folding action in the trapped space does not hurt flowers and grass. Only the most delicate blooms are disturbed by passage of the smooth, heavy crushing surface over them. Grass is almost completely unhurt by this.

Prior methods of controlling cactus include chaining, which has been used against cactus, mesquite, and cedar on ranchland in western Texas. Other varieties of drag tools include towing chunks of railroad rail and large pieces of I-beam laying on its side.

Herbicides offer ranchers an additional tool to maintain brush densities at acceptable levels but carry the risk of toxicity to other plants, animals, and humans.

The mechanical tools (dragging, chaining) had varying degrees of effectiveness, ranging from bad to poor. These tools did varying amounts of damage to the pasture, ranging from moderate to unacceptable. In addition, these tools did a poor job of controlling the infestation of the problem plants.

Herbicide treatments are most effective only when used on brush plants that are small with a low number per acre. Large scale application is disfavored as these treatments act slowly and can be toxic to other beneficial plants and animals.

SUMMARY OF THE INVENTION

The primary object of the invention is to provide a machine for destroying cactus by means of a drag tool.

Another object of the invention is to provide an apparatus that destroys unwanted cactus with minimum damage to grass and wildflowers.

Another object of the invention is to provide a machine that reduces the time and effort required to manage cactus infestation.

A further object of the invention is to provide a machine for eradicating cactus without requiring pick up of cactus debris.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an apparatus for mechanically controlling and eradicating cactus and other succulent plants from farm and ranch pastures and other lands having a cutter deck on the drag tool to break off cactus pads near ground level and a crushing rail to crush and mangle cactus pads increasing the probability that pads will not re-root.

In accordance with another preferred embodiment of the invention, there is disclosed a device using a stabilizer to prevent the tool from turning over when used on uneven terrain and a breakup gap at the cutter deck leading edge to prevent tool from digging into the ground.

A crushing gap between the cutter deck and the crushing rail to increase surface wound on cactus pads enhances effectiveness of the tool.

An adjustment assembly may be attached for varying the deck length to accommodate treatment on varying types of terrain.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
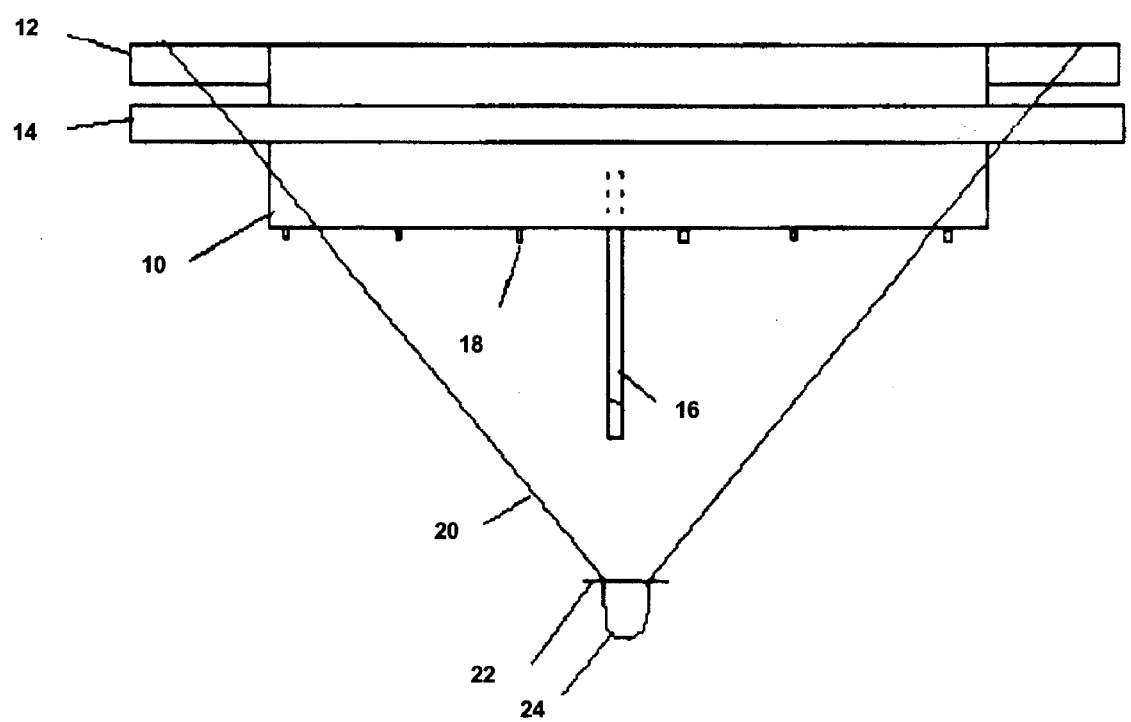
FIG. 1 is a top plan view of a preferred embodiment of the invention.
Figure 2:
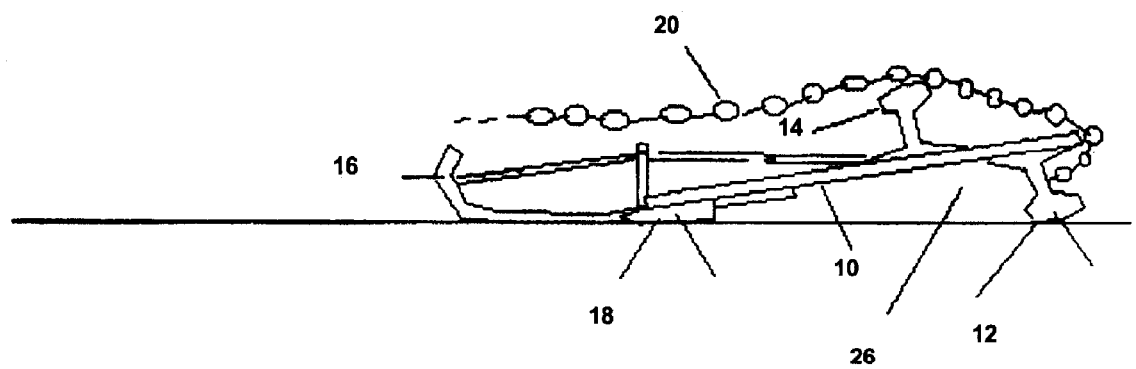
FIG. 2 is a side plan view of a preferred embodiment of the invention.

Turning now to the drawings, FIG. 1 depicts a top plan view of a preferred embodiment of the invention. FIG. 2 depicts a side plan view of a preferred embodiment of the invention. For clarity the same numerical key for invention components is used for both FIGS. 1 and 2. The cutter deck 10 is a piece (or spliced or welded pieces) of heavy material such as a metal plate, preferably a 2 foot by 6 foot ¼ inch thick, mild carbon steel plate or diamond plate. The cutter deck may be made of other suitable materials so long as the overall device has sufficient weight to achieve the desired goal of the user. Mounted below cutter deck 10 is a plurality of skids 18 which lift the cutter deck the desired height over the terrain for which the invention is applied. The cutter height skids 18 are preferably ¼ inch thick, mild carbon steel plate or diamond plate cut into 1 inch high skids 7 inches long with the leading edge ground rounded to a point protruding forward from the leading edge of the cutter deck 10. In the preferred embodiment the cutter height skids 18 are a height of 1 inch and approximately 7 inches long and are spaced 6 inches from each side edge of the cutter deck and then every 15 inches along the leading edge of the cutter deck 10. The gap formed between the ground and the leading edge of the cutter deck is preferably ¾ to 1 inch and prevents the cutter deck from digging into the ground and reduces the chance of any significant damage to grass or wildflowers. The small gap also breaks up into smaller pieces that portion of the cactus which is run over by the tool.

Skids 18 may also be a variety of rollers, balls, wheels or other similar devices that provide variable clearance between the cutter deck and the ground and do not impede the movement of the cutter deck over the terrain.

The crushing rail 12 is a large piece of steel mounted below the trailing edge of the cutter deck 10. In a preferred embodiment the crushing rail is an 8 to 9 foot long piece of 75 to 100 lbs. per yard steel railroad rail. Mounting of the crushing rail 12 below the trailing edge of the cutter deck 10 can be accomplished by a variety of means including bolting, brazing or welding. Crushing rail 12 may also be integrally formed with the cutter deck so long as the rail achieves the desired goal.

Ballast 14 may be mounted on top of the cutter deck 10 to increase tool weight and improve the plant kill ratio. In a preferred embodiment the ballast 14 may consist of an approximately 8 to 9 foot long piece of 75 to 100 lbs. per yard steel railroad yard rail or any steel of similar weight; if rail the weight bearing surface up, positioned about ⅔ of the way back from the leading edge of the cutter deck 10. The ballast 14 may be bolted, brazed or welded onto the cutter deck. Total tool weight should be proportional to the size of cutter deck, for a 2 foot by 6 foot cutter deck 10 the total weight for the tool should be approximately 500 lb. for this size. One may increase the size of the ballast rail or add other steel shapes to reach the desired tool weight. Similarly, the ballast weight could be integrally formed on the cutter deck, or could be fillable containers for sand, water, or other ballast type materials.

The tow bridle 20 is any cable, rope or chain of sufficient strength to drag the tool for the desired effect. The tow bridle is attached to the crushing rail 12 by bolting, or tying the tow bridle to the crushing rail. For the purpose of attaching the tow bridle 20 holes may be fashioned at the ends of the crushing rail 12. In a preferred embodiment the tow bridle 20 consists of any mild steel chain of link size larger than ¼ inch stock with minimum 1½ inch outside eye size is suitable. In an alternative preferred embodiment heavy duty steel cable such as that used by utility companies is used to fashion the tow bridle. A preferred method of attaching the tow bridle 20 is to bolt the bridle to holes in tips of the crushing rail with ⅜ or larger bolts.

In a preferred embodiment a loop-forming bolt 22 is used to "pinch off" a loop of the tow bridle 20 chain or cable on the order of 5 inches across for the hitch. Use 5/16 or larger mild steel bolt about 6 inches long, with fender washers, nuts, and jam nuts. A ball-hitch loop 24 is formed by use of the loop-forming bolt 22 in the preferred embodiment or by fashioning a knotted loop when using a rope of strength sufficient to tow and support the tool. The ball-hitch loop 24 flips over ball-type trailer hitch on the tractor towbar assembly, or other aft-projecting structure suitable for towing trailers and other equipment.

The bridle may also be performed by a rigid member attached to points on the invention for pulling. Conversely, in an embodiment where the invention is pushed like a snow plow, there may be no bridle but rather appropriate attachment points on the back side of the cutter deck for mounting the cutter on the bumper or other attachment to a vehicle for use.

A stabilizer 16 is attached to the cutter deck 10 and prevents the tool from pitching over forward when dragged or pushed over deep nuisance plant infestations, large rocks, and rough terrain. The stabilizer also acts as a handle allowing the operator to lift the tool forward to clear the leading edge of the cutter deck 10 or tip the tool backwards to clear debris from the upper surface of the cutter deck. If the tool flips over, the stabilizer 16 may be used as a handle to right it. In the preferred embodiment the stabilizer comprises a ½ inch by 1 inch mild steel flat bar stock, approximately 3–4 feet long, torch bent into sled runner shape, bolted (two ¾ bolts) to front bottom center of cutter deck, and angled to ride essentially flat to the ground; brace with small scrap and rebar welded to the stabilizer and cutter deck as shown to prevent bending upward.

Turning now to FIG. 2, there is shown a side plan view of the invention. Crushing gap 26 is space between the leading edge of the cutter deck 10 and the crushing rail 12. Cactus piling up underneath the cutter deck against the crushing rail 12 is forced through this essentially zero-dimension gap. This exerts a shearing action on the cactus pieces that cracks them internally, wrinkles and cracks their skin, and sometimes even shears large pieces of skin off. These damaged pieces of nuisance plants dry quickly in place and decompose, obviating the need to gather and dispose of the nuisance plant residue. Crushing rail 12 may have any of a number of cross sectional configurations to achieve the desired goal of attacking the stem of the target plant without digging into the terrain and/or cutting desirable plants such as grass or flowers. Although not shown, the cutter deck 10 could be configured without the individual skids 18 but rather formed with a leading curved edge with or without cutting action much like a toboggan to permit easy movement over desirable plants and terrain without damaging the those plants with the leading edge. In this configuration, the leading edge of cutter deck 10 acts as its own skid permitting movement over terrain and desirable plants while still permitting the cutting action of the crushing rail.

Figure 3:
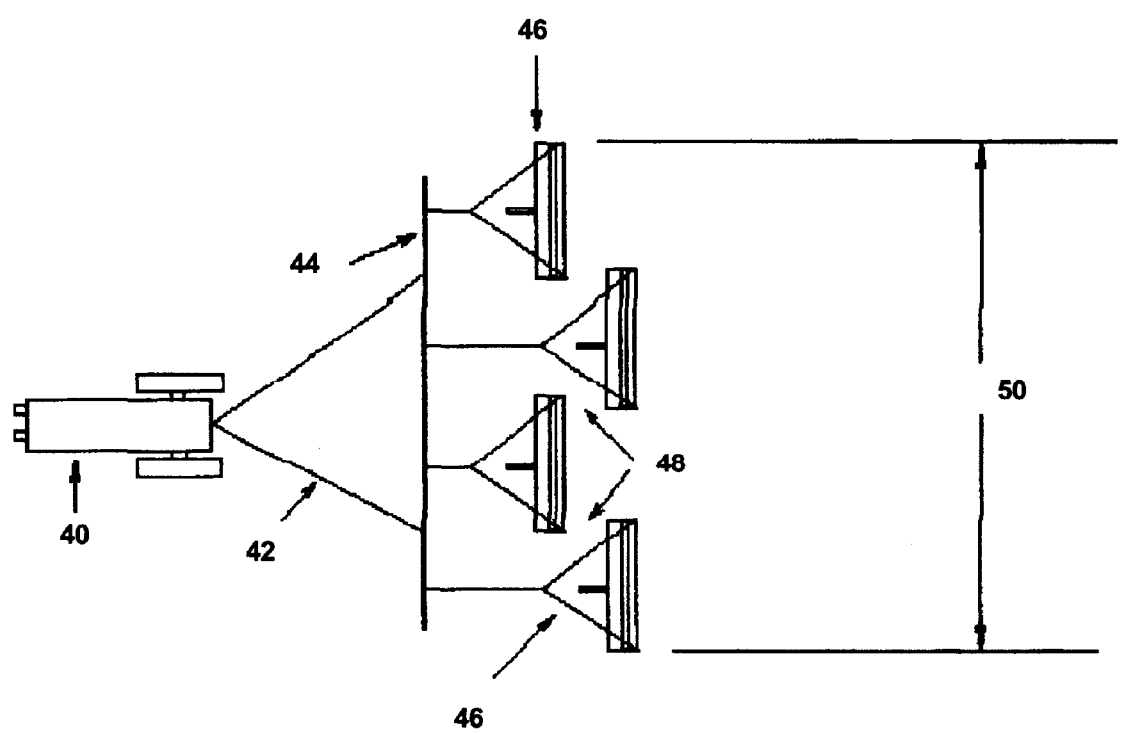
FIG. 3 is a top plan view of an alternative embodiment of invention.

FIG. 3 depicts an embodiment of the invention whereby multiple tools 46 are towed in tandem behind a tractor or other towing vehicle 40. A towbar 44 is attached to the towing vehicle 40 directly or by means of a tow bridle 42. Multiple tools 46 can be attached at various points along the towbar 44 providing overlapping coverage 48 of the area to be treated. The treatment swath 50 provided in one pass is increased by use of multiple tools 46.

Figure 4:
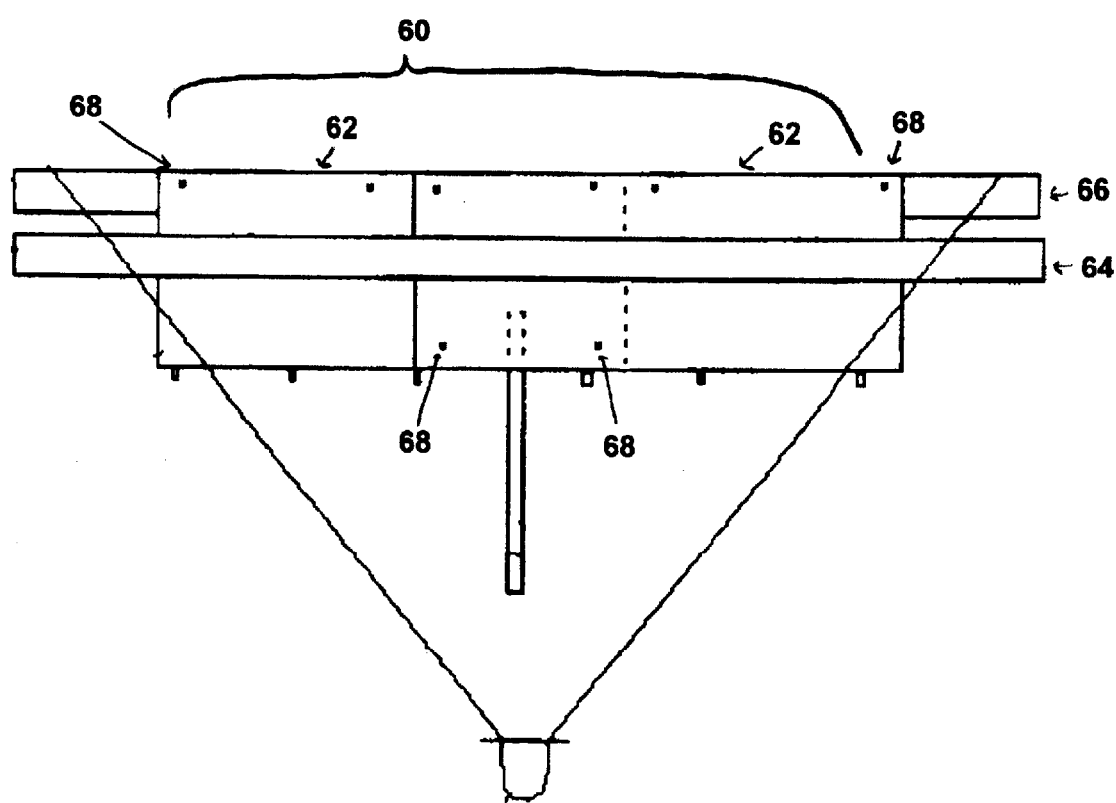
FIG. 4 is a top plan view of an alternative embodiment of the invention.

FIG. 4 depicts an alternative embodiment whereby the cutter deck 60 is comprised of two or more overlapping metal plates 62 attached to both the ballast 64 and crushing rail 66. Adjustment of the treatment swath is made by positioning the overlap of the metal plates to the desired width. Attachment of metal plates together forms the cutter deck. Attachment of the cutter deck to the crushing rail and ballast is accomplished by welding, or use of removable bolts or similar fasteners 68.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for mechanically controlling and eradicating target plants from farm and ranch pastures and other lands comprising:
    a base for dragging over terrain for removal of target plants;
    a rail having a cross sectional shape with a protruding forward surface disposed transversely to the forward movement of said base and on the underside of said base to crush and mangle said plants;
    a plurality of skids at the leading bottom edge of said base to prevent the base from digging into the ground; and
    a space between the leading edge of the base and the crushing rail.

2. An apparatus for mechanically controlling and eradicating target plants from farm and ranch pastures and other lands as claimed in claim 1 further comprising a ballast rail to increase the weight of the tool and enhance the crushing action.

3. An apparatus for mechanically controlling and eradicating target plants from farm and ranch pastures and other lands as claimed in claim 2 further comprising a chain tow bridle to attach the tool to the towing vehicle.

4. An apparatus for mechanically controlling and eradicating target plants from farm and ranch pastures and other lands as claimed in claim 3 further comprising a loop forming bolt to hold the bridle.

5. An apparatus for mechanically controlling and eradicating target plants from farm and ranch pastures and other lands as claimed in claim 2 further comprising a cable assembly to attach the tool to the towing vehicle.

6. An apparatus for mechanically controlling and eradicating target plants from farm and ranch pastures and other lands comprising:
    a cutter deck on the drag tool to break off target plants near ground level;
    a crushing rail having a generally rounded forwardly protruding surface to crush and mangle target plants increasing the probability that said plants will not reroot;
    a stabilizer to prevent the tool from turning over when used on uneven terrain;
    a plurality of skids at the cutter deck leading edge to prevent tool from digging into the ground;
    a crushing gap between the cutter deck and the crushing rail to increase surface wounds on said plants; and
    an adjustment assembly for varying the deck length to accommodate treatment on varying types of terrain.

7. An apparatus for mechanically controlling and eradicating target plants from farm and ranch pastures and other lands as claimed in claim 6 further comprising a ballast rail to increase the weight of the tool and enhance the crushing action.

8. An apparatus for mechanically controlling and eradicating target plants from farm and ranch pastures and other lands as claimed in claim 3 further comprising a chain tow bridle to attach the tool to the towing vehicle.

9. An apparatus for mechanically controlling and eradicating target plants from farm and ranch pastures and other lands as claimed in claim 8 further comprising a loop forming bolt to hold the bridle.

10. An apparatus for mechanically controlling and eradicating target plants from farm and ranch pastures and other lands as claimed in claim 7 further comprising a cable assembly to attach the tool to the towing vehicle.

* * * * *